United States Patent
Bertram et al.

(10) Patent No.: US 7,987,192 B2
(45) Date of Patent: Jul. 26, 2011

(54) HYBRID DATA MODEL AND USER INTERACTION FOR DATA SETS IN A USER INTERFACE

(75) Inventors: Randal Lee Bertram, Raleigh, NC (US); Anthony Wayne Erwin, Rochester, MN (US); Steven Gene Halverson, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/146,219

(22) Filed: Jun. 25, 2008

(65) Prior Publication Data

US 2009/0327319 A1 Dec. 31, 2009

(51) Int. Cl.
*G06F 7/00* (2006.01)
*G06F 17/30* (2006.01)

(52) U.S. Cl. .................. 707/752; 707/754; 707/805

(58) Field of Classification Search .................. 707/736, 707/752, 755, 758, 770, 695, 754, 803, 805
See application file for complete search history.

(56) References Cited

U.S. PATENT DOCUMENTS

| | | | |
|---|---|---|---|
| 5,710,915 A * | 1/1998 | McElhiney | 1/1 |
| 6,023,280 A | 2/2000 | Becker et al. | |
| 6,539,391 B1 * | 3/2003 | DuMouchel et al. | 1/1 |
| 6,907,422 B1 * | 6/2005 | Predovic | 1/1 |
| 7,035,851 B1 * | 4/2006 | Sinclair et al. | 1/1 |
| 7,054,877 B2 * | 5/2006 | Dettinger et al. | 707/718 |
| 7,143,339 B2 * | 11/2006 | Weinberg et al. | 715/212 |
| 7,386,554 B2 * | 6/2008 | Ripley et al. | 1/1 |
| 7,783,648 B2 * | 8/2010 | Bateni et al. | 707/752 |
| 2007/0016558 A1 | 1/2007 | Bestgen et al. | |
| 2007/0244849 A1 | 10/2007 | Predovic | |

* cited by examiner

*Primary Examiner* — Don Wong
*Assistant Examiner* — Merilyn P Nguyen
(74) *Attorney, Agent, or Firm* — Rabindranath Dutta; Konrad Raynes and Victor LLP

(57) ABSTRACT

A first data model in which a large dataset is stored is maintained, wherein a first set of operations is allowed to be performed on the first data model. The first data model is reduced to a second data model that is of a smaller size than the first data model. Selected operations of the first set of operations are restricted from being performed on the second data model. A second set of operations is performed on the second data model, wherein the second set of operations is a subset of the first set of operations, and wherein the second set of operations does not include the selected operations that have been restricted from being performed on the second data model.

20 Claims, 10 Drawing Sheets

200

204

ATKNAV014I
300,100 items are in the group. 300,100 have been filtered, but only the first 500 are shown. Use search and filter to narrow your results.
Close Message Groups > All Endpoints (Members)

[Actions ▼] | [Search the table...] [Search]

| Select | Name<br>Filter — 206a — 208 | State<br>Filter | Compliance<br>Filter | Type<br>Filter | Description<br>Filter |
|---|---|---|---|---|---|
| ☐ | chubby2.rchland.ibm.com | Locked | ☐ OK | Server | |
| ☐ | diroc.rchland.ibm.com | Locked 206b | ☐ OK 206c | Server 206d | 206e |
| ☐ | 9-10-111-36.rchland.ib... | Locked | ☐ OK | Server | |
| ☐ | chainsaw.rchland.ibm.com | Locked | ☐ OK | Server | NativeManaged... |
| ☐ | hci225.pdl.pok.ibm.com | Locked | ☐ OK | Server | |
| ☐ | dnguyen.rchland.ibm.com | Locked | ☐ OK | Server | NativeManaged... |
| ☐ | hci215.pdl.pok.ibm.com | Locked | ☐ OK | Server | |
| ☐ | hci216.pdl.pok.ibm.com | Locked | ☐ OK | Server | |
| ☐ | hcx208.pdl.pok.ibm.com | In Service | ☐ OK | Server | |
| ☐ | hcx207.pdl.pok.ibm.com | Locked | ☐ OK | Server | |
| ☐ | chainsaw.rchland.ibm.com | Locked | ☐ OK | Server | |
| ☐ | dnguyen.rchland.ibm.com | Locked | ☐ OK | Server | |
| ☐ | ALOHAblackbird.rchland.... | Locked | ☐ OK | Server | |
| ☐ | HCX200.pdl.pok.imb.com | Locked | ☐ OK | Server | NativeManaged... |
| ☐ | frozentundra.rchland.ib.... | Locked | ☐ OK | Server | NativeManaged... |

|◄◄ ◄ Page 1 of 2 ► ►►| [1] [→] | Selected: 0 Total: [300,100] Filtered: [300,100] Available: [500]

ATKNAV014I
300,100 items are in the group. 300,100 have been filtered, but only the first 500 are shown. Use search and filter to narrow your results.
Close Message

304

Groups > All Endpoints (Members)

| Select | Name /208 | State | Compliance | Type | Description |
|---|---|---|---|---|---|
| | Filter | Filter | Filter | Filter | Filter |
| ☐ | chubby2.rchland.i | | | | |
| ☐ | diroc.rchland.ibm. | | | | |
| ☐ | 9-10-111-36.rchl | | | | |
| ☐ | chainsaw.rchland. | | | | NativeManaged... |
| ☐ | hci225.pdl.pok.ibr | | | | |
| ☐ | dnguyen.rchland.i | | | | NativeManaged... |
| ☐ | hci215.pdl.pok.ibm.com | Locked | OK | Server | |
| ☐ | hci216.pdl.pok.ibm.com | Locked | OK | Server | |
| ☐ | hcx208.pdl.pok.ibm.com | In Service | OK | Server | |
| ☐ | hcx207.pdl.pok.ibm.com | Locked | OK | Server | |
| ☐ | chainsaw.rchland.ibm.com | Locked | OK | Server | |
| ☐ | dnguyen.rchland.ibm.com | Locked | OK | Server | |
| ☐ | ALOHAblackbird.rchland.... | Locked | OK | Server | |
| ☐ | HCX200.pdl.pok.imb.com | Locked | OK | Server | NativeManaged... |
| ☐ | frozentundra.rchland.ib.... | Locked | OK | Server | NativeManaged... |

Filter

Condition: Text /306
Contains ▼ ibm    ☐ Match case

OK  Cancel

Page 1 of 2 | 1 | Selected: 0  Total: 300,100  Filtered: 300,100  Available: 500

> ⓘ ATKNAV014I
> 300,100 items are in the group. 223,125 have been filtered, but only the first 500 are shown. Use search and filter to narrow your results.
> Close Message Groups > All Endpoints (Members)

| Select | Name | State | Compliance | Type | Description |
|---|---|---|---|---|---|
| | ☑ ibm —404 | | | | |
| | Filter | Filter | Filter | Filter | |
| ☐ | jkugle1.rchland.ibm.com | 🔒 Locked | ☐ OK | Server | |
| ☐ | cskytp.rchland.ibm.com | 🔒 Locked | ☐ OK | Server | |
| ☐ | chubby2.rchland.ibm.com | 🔒 Locked | ☐ OK | Server | |
| ☐ | 9-10-111-36.rchland.ib... | 🔒 Locked | ☐ OK | Server | |
| ☐ | bang.rchland.ibm.com | 🔒 Locked | ☐ OK | Server | |
| ☐ | chainsaw.rchland.ibm.com | 🔒 Locked | ☐ OK | Server | NativeManaged... |
| ☐ | dnguyen.rchland.ibm.com | 🔒 Locked | ☐ OK | Server | NativeManaged... |
| ☐ | 9-10-110-77.rchland.ib... | 🔒 Locked | ☐ OK | Server | |
| ☐ | hcx210.pdl.pok.ibm.com | 🔒 Locked | ☐ OK | Server | |
| ☐ | einstein.rchland.ibm.com | 🔒 Locked | ☐ OK | Server | |
| ☐ | 9-10-112-76.rchland.ib... | 🔒 Locked | ☐ OK | Server | |
| ☐ | hcx207.pdl.pok.ibm.com | 🔒 Locked | ☐ OK | Server | NativeManaged... |
| ☐ | barnabyjones.rchland.ib... | 🔒 Locked | ☐ OK | Server | |
| ☐ | baja2.rchland.ibm.com | 🔒 Locked | ☐ OK | Server | |
| ☐ | kathrynl-linux.rchland.ib... | 🔒 Locked | ☐ OK | Server | |

Page 1 of 2   [1]   | Selected: 0  Total: 300,100  Filtered: 223,125  Available: 500

ⓘ ATKNAV014I
300,100 items are in the group. 101,356 have been filtered, but only the first 500 are shown. Use search and filter to narrow your results.
Close Message Groups > All Endpoints (Members)    ╱502    ╱508

[ Actions ▼ ] | [ rchland    ✕ ] [ Search ]

| Select | Name | State | Compliance | Type | Description |
|---|---|---|---|---|---|
| | Filter | Filter | Filter | Filter | Filter |
| ☐ | 🖥 chubby2.rchland.ibm.com | 🔒 Locked | ☐ OK | Server | |
| ☐ | 🖥 jweaver5.rchland.ibm.com | 🔒 Locked | ☐ OK | Server | |
| ☐ | 🖥 diroc.rchland.ibm.com | 🔒 Locked | ☐ OK | Server | |
| ☐ | 🖥 9-10-111-36.rchland.ib... | 🔒 Locked | ☐ OK | Server | |
| ☐ | 🖥 chainsaw.rchland.ibm.com | 🔒 Locked | ☐ OK | Server | NativeManaged... |
| ☐ | 🖥 ibm-lw54gmw62jf.rchlan... | 🔒 Locked | ☐ OK | Server | NativeManaged... |
| ☐ | 🖥 dnguyen.rchland.ibm.com | 🔒 Locked | ☐ OK | Server | NativeManaged... |
| ☐ | 🖥 chainsaw.rchland.ibm.com | 🔒 Locked | ☐ OK | Server | |
| ☐ | 🖥 dnguyen.rchland.ibm.com | 🔒 Locked | ☐ OK | Server | |
| ☐ | 🖥 ALOHAblackbird.richland... | 🔒 Locked | ☐ OK | Server | |
| ☐ | 🖥 frozentundra.rchland.ib... | 🔒 Locked | ☐ OK | Server | NativeManaged... |
| ☐ | 🖥 massey.rchland.ibm.com | 🔒 Locked | ☐ OK | Server | NativeManaged... |
| ☐ | 🖥 graced.rchland.ibm.com | 🔒 Locked | ☐ OK | Server | |
| ☐ | 🖥 mriedem.rchland.ibm.com | 🔒 Locked | ☐ OK | Server | |
| ☐ | 🖥 kenosha.rchland.ibm.com | 🔒 Locked | ☐ OK | Server | |

|◀◀ Page 1 of 2 ▶▶| [ 1 ] [↗] | Selected: 0  Total: [300,100] Filtered: [101,356] Available: [500]

|  | Simple | Hybrid | Hybrid Complete |
|---|---|---|---|
| <= membership threshold | ✓ | X | X |
| > membership threshold \ 602 | X | ✓ \ 604 | X (can only transition to hybrid complete, never start there) |

FIG. 6

|  | Simple | Hybrid | Hybrid Complete |
|---|---|---|---|
| Can transition to hybrid | ✓ (if a lot of objects are added on the server such as during discovery) | X | ✓ |
| Can transition to simple | X | X | X |
| Sort | ✓ | X | ✓ |
| Filter | ✓ | ✓ | ✓ |
| Filter row on by default | X | ✓ | X (never start here) |
| Search | ✓ | ✓ (limited) | ✓ (limited) |
| Information message at top | X | ✓ | X |
| Dynamic refresh enabled (automatically reflect data changes from the server) | ✓ | ✓ | ✓ |
| Column management enabled | ✓ | ✓ | ✓ |

FIG. 7

HYBRID DATA MODEL AND USER INTERACTION FOR DATA SETS IN A USER INTERFACE

BACKGROUND

1. Field

The disclosure relates to a method, system, and article of manufacture for a hybrid data model and user interaction for data sets in a user interface.

2. Background

In certain software applications, a user may need to view and interact with a set of data in tabular form, wherein the set of data may be stored in a server. When the data sets are of a reasonable size, all of the data can be loaded into a data model in a client at start-up and the user can then page, sort, filter, and search a data set without any further interactions with the server. Such an approach for interacting with a data set may be referred to as a "simple" data model approach. In certain situations, in which the data set is a table, the "simple" data model may include all of the rows of a data set represented in the user interface and may allow paging, sorting, filtering, searching and other requests from the user interface by a user.

However, sometimes the data set stored in the server is very large (e.g., hundreds of thousands or millions of records), and it may not be feasible or appropriate to load all of this data at one time. Several solutions exist for "large" data model support in which a table data model (maintained at a client) representing the data set requests only the "chunk" of data needed by a user at a given time. Subsequent requests to page, sort, filter, and search are delegated by the table data model to the server instead of being handled directly at the client. The table data model stored at the client cannot support these operations directly because the table model stored at the client is only aware of a subset of data at any one time.

SUMMARY OF THE PREFERRED EMBODIMENTS

Provided are a method, system, an article of manufacture, wherein a first data model in which a large dataset is stored is maintained, wherein a first set of operations is allowed to be performed on the first data model. The first data model is reduced to a second data model that is of a smaller size than the first data model. Selected operations of the first set of operations are restricted from being performed on the second data model. A second set of operations is performed on the second data model, wherein the second set of operations is a subset of the first set of operations, and wherein the second set of operations does not include the selected operations that have been restricted from being performed on the second data model.

In further embodiments the first data model is a server data model that is stored in a server, and the second data model is a table data model that is stored in a client, wherein a user interface corresponding to the table data model that is stored in the client is a hybrid table, wherein the reducing of the first data model in which the large dataset is stored to the second data model that is the table data model is performed by table filtering.

In still further embodiments, the selected operations that are restricted from being performed in the table data model that is stored in the client include sorting operations.

In yet further embodiments, the table data model that is stored in the client switches from a hybrid mode to a hybrid complete mode, wherein in the hybrid complete mode the sorting operations are allowed on the table data model stored in the client.

In additional embodiments, operations are performed to change the server data model stored in the server. The table data model stored in the client is updated, in response to the change in the server data model stored in the server.

BRIEF DESCRIPTION OF THE DRAWINGS

Referring now to the drawings in which like reference numbers represent corresponding parts throughout:

FIG. 2 shows a hybrid table, in accordance with certain embodiments;

FIG. 3 shows filtering operations being performed on a hybrid table, in accordance with certain embodiments;

FIG. 4 shows search operations being performed on a hybrid table, in accordance with certain embodiments;

FIG. 5 shows the results obtained after search operations have been performed on a hybrid table, in accordance with certain embodiments;

FIG. 6 shows how various data models are used, in accordance with certain embodiments;

FIG. 7 shows various operations that are performed in different data models, in accordance with certain embodiments;

DETAILED DESCRIPTION

Figure 1:
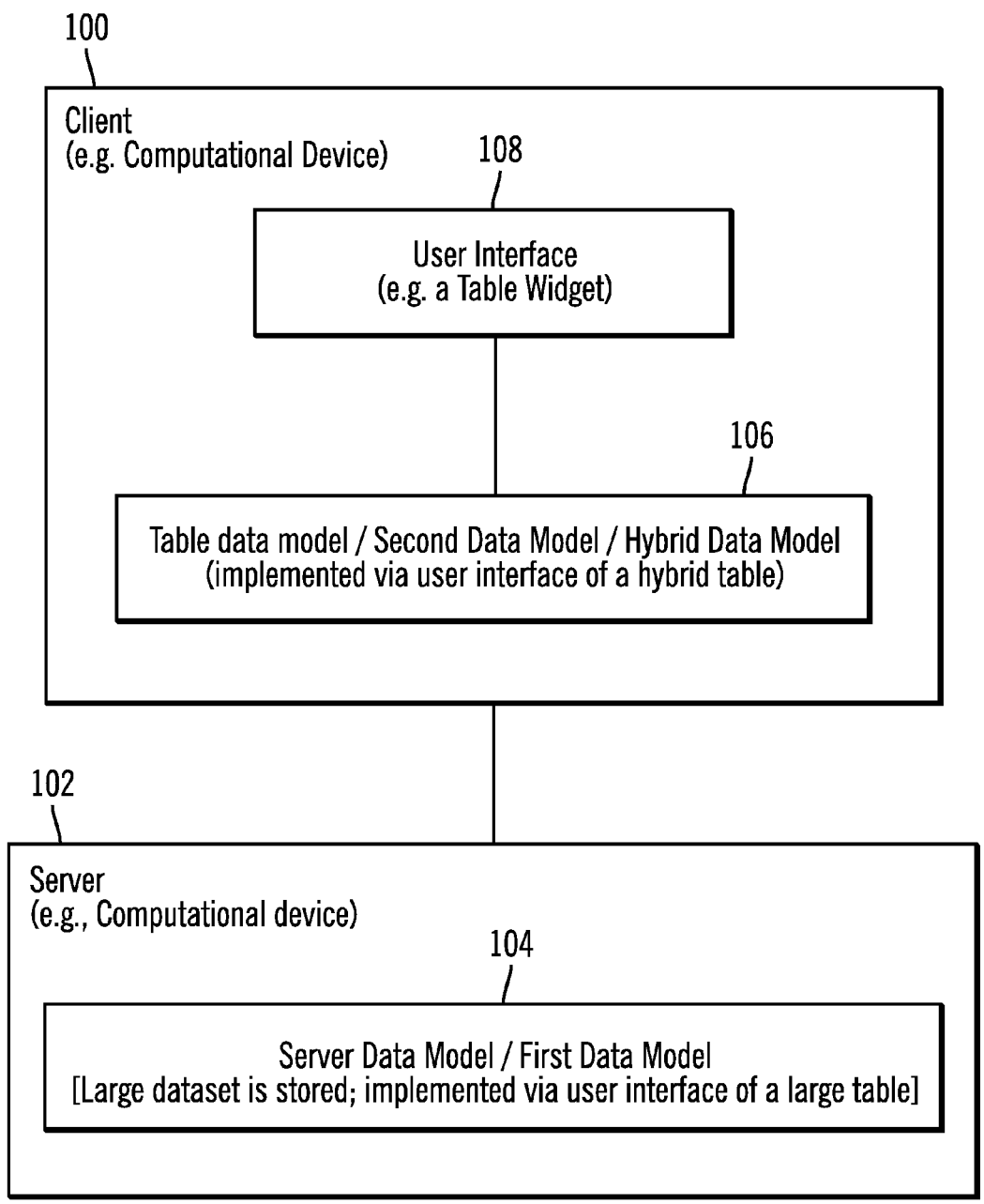
FIG. 1 illustrates a block diagram of a hybrid data model architecture for interfacing with a user interface, in accordance with certain embodiments.

In the following description, reference is made to the accompanying drawings which form a part hereof and which illustrate several embodiments. It is understood that other embodiments may be utilized and structural and operational changes may be made.

Certain solutions for "large" data model support may have limitations. For example, the server may be required to support chunking, wherein chunking is the ability of the server to return a given page of data on request by the user interface. This can be impractical in many situations such as when the data is aggregated from multiple resources, including multiple database tables. Furthermore, this may not be feasible when the data in the model is dynamic. In such a situation, operations such as resorting may have to be performed very fast since resorting may have to be performed asynchronously, and the server may not be able to perform a sort over the entire data set at a suitable speed. Additionally, a user may have to examine an overwhelming amount of data. While the user is given the capability to examine the overwhelming amount of data, it is not practical for the user to page through hundreds of thousands of records. It is desirable for the user to proceed as quickly as possible to sort or filter in order to find the data of interest.

Certain embodiments provide a "hybrid" data model approach which combines certain aspects of "simple" and "large" data models. The hybrid approach begins with a large model and uses standard, built-in table controls to reduce the large model down to a size that can be handled by a simple model. If the data set to be retrieved is greater than a configurable "collection count threshold" (e.g., 5000), the table may be configured to proceed into a hybrid data model mode. One of the characteristics of this mode is that it provides controls for filtering the huge data set into a smaller data set, allowing the table to function as if the table had a simple data model. This is not inconvenient to the user, because with a large table model the user has to first perform filtering. Since the filtering can be performed on columns optimized for the type of data shown, the filtered results may provide a faster and more accurate way to find the subset of objects than generalized filter methods.

Certain embodiments do not show any table data until the user has filtered the data to a small enough size. In certain additional embodiments, the table can initially show a subset of data. The table retrieves a subset of the overall data set equal to the collection count threshold and contains a small portion of all the data.

In certain embodiments, the user may provide information to indicate that the table is in a special mode that shows a subset of data. The user may provide instruction to use the table's standard search and filter controls to quickly scale down the current collection to the desired subset. The goal is for the user to easily get the number of rows available in the table below the collection count threshold, such that the table can be used more like simple table (this may be termed "hybrid complete").

In certain embodiments, filtering and search may be delegated to the server. The columns that can be filtered and searched are determined by the server's capabilities. In certain embodiments, as many optimized columns as possible may be added, but it is still likely to be a subset of what could be filtered or searched if the table were in simple mode and contained all of the data.

In certain embodiments, "paging/scrolling" and "select/deselect all" operations are limited to the subset of data. Sorting is disabled for usability reasons because the user may not know the boundary between what is loaded and what is not. If sorting is not disabled, the user may not be able to determine whether the sorting took place across all data or just the subset of data.

In certain embodiments, updates to data on the server are automatically reflected in the table. The table may switch between hybrid and hybrid complete modes as objects are created/deleted on the server. Once the user has filtered the data adequately to cause the table to transfer into hybrid complete mode, the table regains some functionality that had been disabled (such as sorting). The hybrid approach affords the user certain features of both the simple and large model approaches. The characteristics of the hybrid approach described above are further described below in the context of the exemplary embodiment.

Exemplary Embodiments

FIG. 1 illustrates a block diagram of a hybrid data model architecture for interfacing with a user interface, in accordance with certain embodiments. In FIG. 1, a client 100 is coupled to a server 102, wherein the client 100 and the server 102 may comprise computational devices. The server 102 includes a data set 104 that may comprise a large data set, wherein the data set 104 may be represented as a hybrid data model 106 in the client 100. The user interface 108 associated with the client 100 is used to interact with the hybrid data model 106. In certain embodiments in which the data set 104 is a large table, the "hybrid" data model 106 may allow the performing of paging, filtering, searching and certain other requests from the user interface 108.

FIG. 2 shows a certain embodiments implemented in the client 100. A user interface 200 (corresponding to the user interface 108 of FIG. 1) that interfaces with the hybrid data model 106 is shown in FIG. 2, wherein the hybrid table 202 shown in FIG. 2 is in conformity with the hybrid data model 106 shown in FIG. 1.

A message box 204 is shown in FIG. 2, wherein the message box 204 advises the user of the occurrence of certain events. The message box 204 may also include a link to a help function that provides greater detail about the hybrid mode. The message box 204 may provide the total number of items in the collection as well as the number in the view. The total number of items may drop as the user filters the collection. For example, in FIG. 2 the message box 204 indicates that 300,100 items are in the group, 300,100 have been filtered, but only the first 500 are shown. The user is also asked to search and filter to narrow the results shown in the hybrid table 202. Therefore, FIG. 2 shows that out of 300,100 items originally presented the data set 104 only the first 500 are being shown in the hybrid table 202.

The filtered rows are shown by default in the hybrid table. This is the row below the column headers with a "Filter" link 206a, 206b, 206c, 206d, 206e for each column that is filterable. The user clicks on a "Filter" link 206a, 206b, 206c, 206d, 206e to filter a particular column. For example, to filter on the first column 208 the user may click on the "Filter" link 206a.

FIG. 3 shows certain embodiments implemented in the client 100. A user interface 300 corresponds to the user interface 200 of FIG. 2. FIG. 3 shows an example of applying a filter 304 of "ibm" 306 in the first column 208 of the hybrid table 202. The hybrid table 202 and the first column 208 are the same in FIG. 2 and FIG. 3. The filter 304 of "ibm" 306 is being applied to the first column 208 of the hybrid table 202.

FIG. 4 shows a certain embodiments implemented in the client 100. A user interface 400 corresponds to the user interface 300 of FIG. 3. FIG. 4 shows the result of applying the filter 304 of "ibm" 306 in the first column 208 of the hybrid table 202 (of FIG. 2 and FIG. 3). The hybrid table 402 shown in FIG. 4 has been filtered with rows that have "ibm" in the first column 404. The message header 406 indicates that while 300,100 items were originally in the data set 104, the data set has been filtered down to 223,125 items but only the first 500 are shown in the hybrid table 402.

FIG. 5 shows a certain embodiments implemented in the client 100. A user interface 500 corresponds to the user interface 400 of FIG. 4. FIG. 5 shows the result of applying the search 502 of "rchland" applied to the items of the hybrid table 402 (of FIG. 4) to generate the hybrid table 504. It can be seen that the entries with "rchland" included are them are the ones that are shown after the search. The message header 506 indicates that while 300,100 items were originally in the data set 104, the data set has been filtered down to 101,356 items but only the first 500 are shown in the hybrid table 504.

In certain embodiments, the search shown in FIG. 5 supports textual columns only. The message header 506 may indicate (not shown in FIG. 5) that only textual columns are included. Clicking the search button 508 adds the text that is typed in the search field 502 to the collection's criteria. This means that search operations will work differently in the hybrid mode than it normally does in a table model. Normally when search operates on the table model, the search operations include numeric and other types of columns. Also, in hybrid mode, the search highlighting may avoid highlighting text in columns that are not included in the actual search.

In hybrid mode, the table model is loaded with subset of rows that is allowed by the large collection threshold. The following table features/operations are available:
1. Paging
2. Page-down and page-up behave normally
3. Page-last goes to bottom of subset
4. Go-to-page goes to a page in the subset
5. Tasks on resources
6. Selection of rows
7. Select All/Deselect All
8. Updates to data on the server 102 are automatically reflected in the table 106.
9. Sorting is disabled in the hybrid mode. The table is sorted initially by the resource name column. This reflects the way the main database table is indexed. Sorting on the subset of data that is loaded into the table model 106 may be confusing to the user, because the user does not know the boundary between what is loaded into the table model 106 and what is not loaded into the table model 106.
10. Column management operations are allowed. The user can add columns that are needed for the desired filtering.
11. The footer 510 is augmented to include an "Available" count 512 which equals the large collection threshold. In addition, a pager may page through rows 0 to the large collection threshold. The large collection threshold may reduce the number of pages to page through in comparison to the number of pages that have to be paged through if the entire data set had been loaded Some of the behavior in the above list may be relaxed if the mode changes to hybrid complete by reducing the list of resources below the large collection threshold.

FIG. 6 shows a table 600 that indicates what type of data sets cause the different modes to be applied. For example, if the membership threshold 602 is exceeded then hybrid mode 604 is applied.

FIG. 7 shows certain operations performed in the different modes, such as simple, hybrid, and hybrid complete. The last column 702 shows the operations that occur when the collection has changed from a hybrid to a hybrid complete collection through user filtering. It can be seen that sorting 704 is disabled in the hybrid mode and searching 706 is limited in the hybrid mode.

In certain embodiments, multiple tables on one page are supported in the hybrid mode. In these cases, all tables need a message. In such cases, there may be multiple hybrid mode messages at the top of the screen.

In certain alternative embodiments, a data set can represent a topology that comprises objects and relationships between the objects. A topology cannot be rendered in hybrid mode, so a message may be displayed to the user instructing the user to go to the table and perform searching and filtering operations. Once the user has filtered down to a hybrid complete collection, all objects and relationships are available and a topology map of the data set can be rendered.

Certain embodiments provide handling of dynamic data updates, wherein updates to data on the server are automatically reflected in the table. The operations for such updates vary from simple mode in a variety of ways because updates to data can occur both inside and outside the subset of data known to the table.

In addition, data changes can potentially force mode changes as well. For example, if objects are added when operations are being performed inside the subset, the table needs to insert the row and update the table footer and informational message. If the table was in simple or hybrid complete mode, the mode may be changed to full hybrid. If outside the subset, there is no row for the table to insert, but table footer and informational message may need to be updated.

If an object is removed, then if the object inside the subset, the table needs to remove the row and update table footer and informational message. If the object outside the subset, then the table footer and informational message is updated. Both cases may cause the hybrid mode to switch to hybrid complete.

If object properties are changed it may mean that an object is added/removed from the subset. If an object that is updated is inside the subset, the table cell is updated. If an object that is updated is outside the subset then no action needs to be taken.

Figure 8:
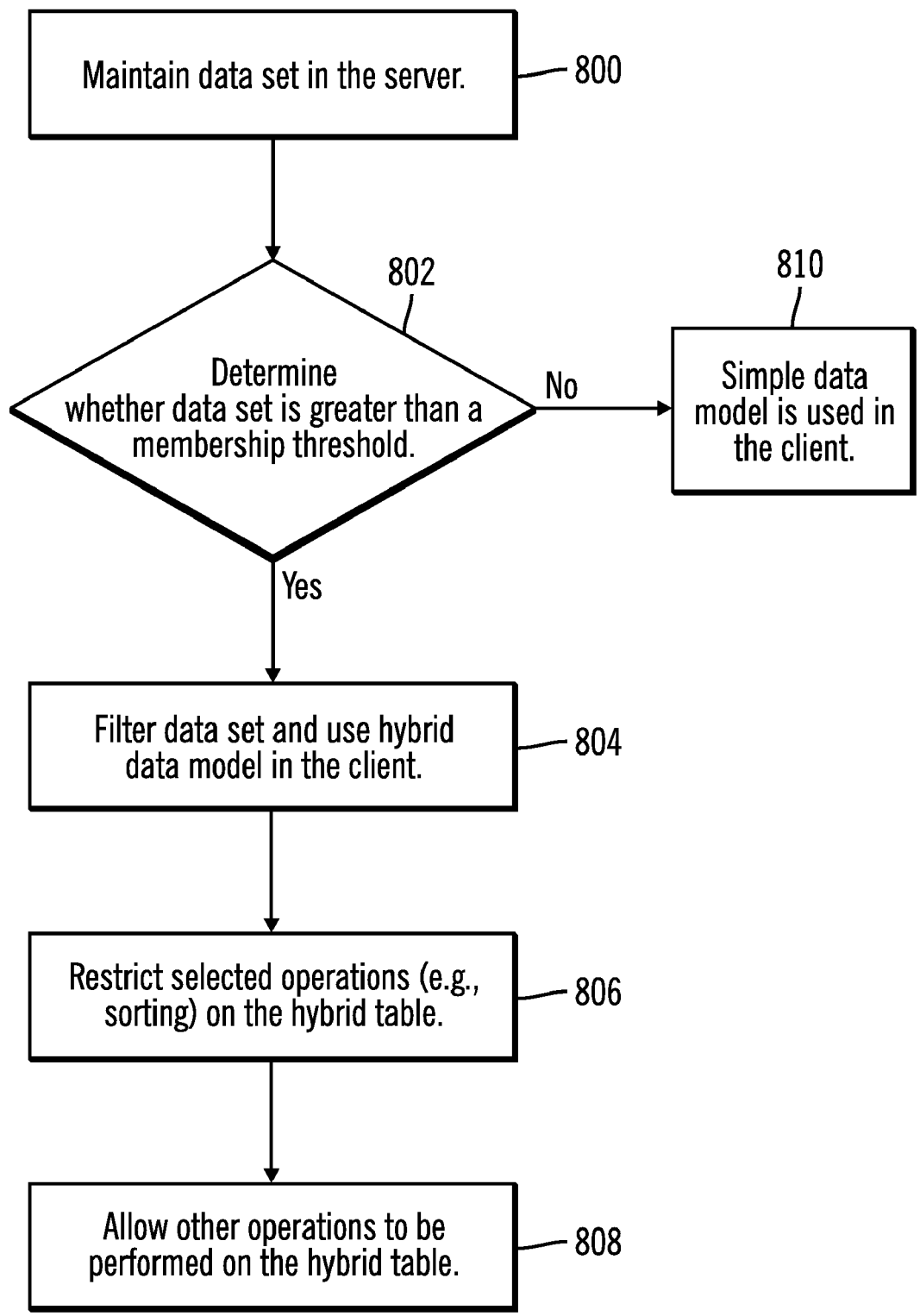
FIG. 8 is a flowchart that shows first operations being performed, in accordance with certain embodiments.

FIG. 8 is a flowchart that shows first operations implemented in the client 100 and the server 102 of the computing environment of FIG. 1.

Control starts at block 800 in which a large data set 104 is maintained in the server 102. Control proceeds to block 802, where a determination is made at the client 100 as to whether the data set 104 is greater than a membership threshold, such as the membership threshold 602 shown in FIG. 6. If the data set 104 is greater than the membership threshold, then control proceeds to block 804. At block 804 a user filters the data set by using the user interface 108 in the client 100 to generate the hybrid data model 106, and subsequently uses the hybrid data model 106. Selected operations, such as sorting, are restricted (block 806) on the hybrid table corresponding to the hybrid data model 106, whereas other operations are allowed (at block 808) to be performed on the hybrid table corresponding to the hybrid data model 106, wherein the data set 104 is a large table. If at block 802, the data set 104 is not greater than the membership threshold, then control proceeds to block 810 in which a simple data model is used in the client 100.

Figure 9:
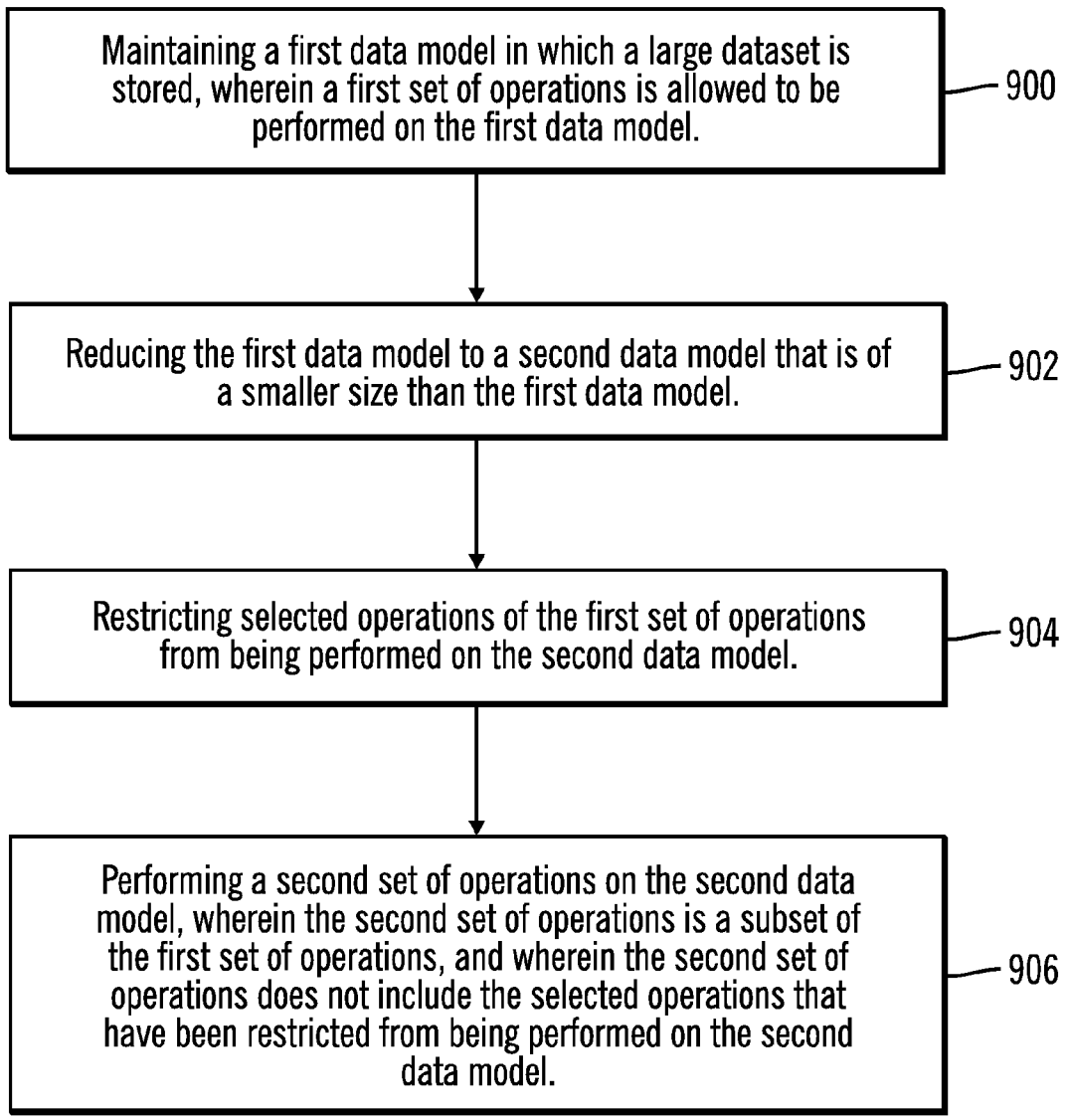
FIG. 9 is a flowchart that shows second operations being performed, in accordance with certain embodiments.

FIG. 9 is a flowchart that shows second operations implemented in the client 100 and the server 102 of the computing environment of FIG. 1.

Control starts at block 900 in which a first data model 104 (corresponds to a server data model) in which a large dataset is stored is maintained, wherein a first set of operations is allowed to be performed on the first data model. Control proceeds to block 902, wherein the first data model 104 is reduced to a second data model 106 (corresponds to a table data model) that is of a smaller size than the first data model 104. Selected operations of the first set of operations are restricted (at block 904) from being performed on the second data model 106. A second set of operations is performed (at block 906) on the second data model, wherein the second set of operations is a subset of the first set of operations, and wherein the second set of operations does not include the selected operations that have been restricted from being performed on the second data model. In certain embodiments, the first data model 104 is server data model that is stored in the server 102 and the second table 106 is a table data model that is stored in the client 100, wherein a user interface corresponding t the table data model that is stored in the client is a hybrid table. In yet further embodiments, the selected operations that are restricted from being performed in the table data model 106 that is stored in the client include sorting operations.

Therefore, FIG. 9 shows certain embodiments in which a large table is reduced to a hybrid table for interacting with data. In certain embodiments, the hybrid table is more efficient for a user to use in comparison to a simple table or a large table.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 10:
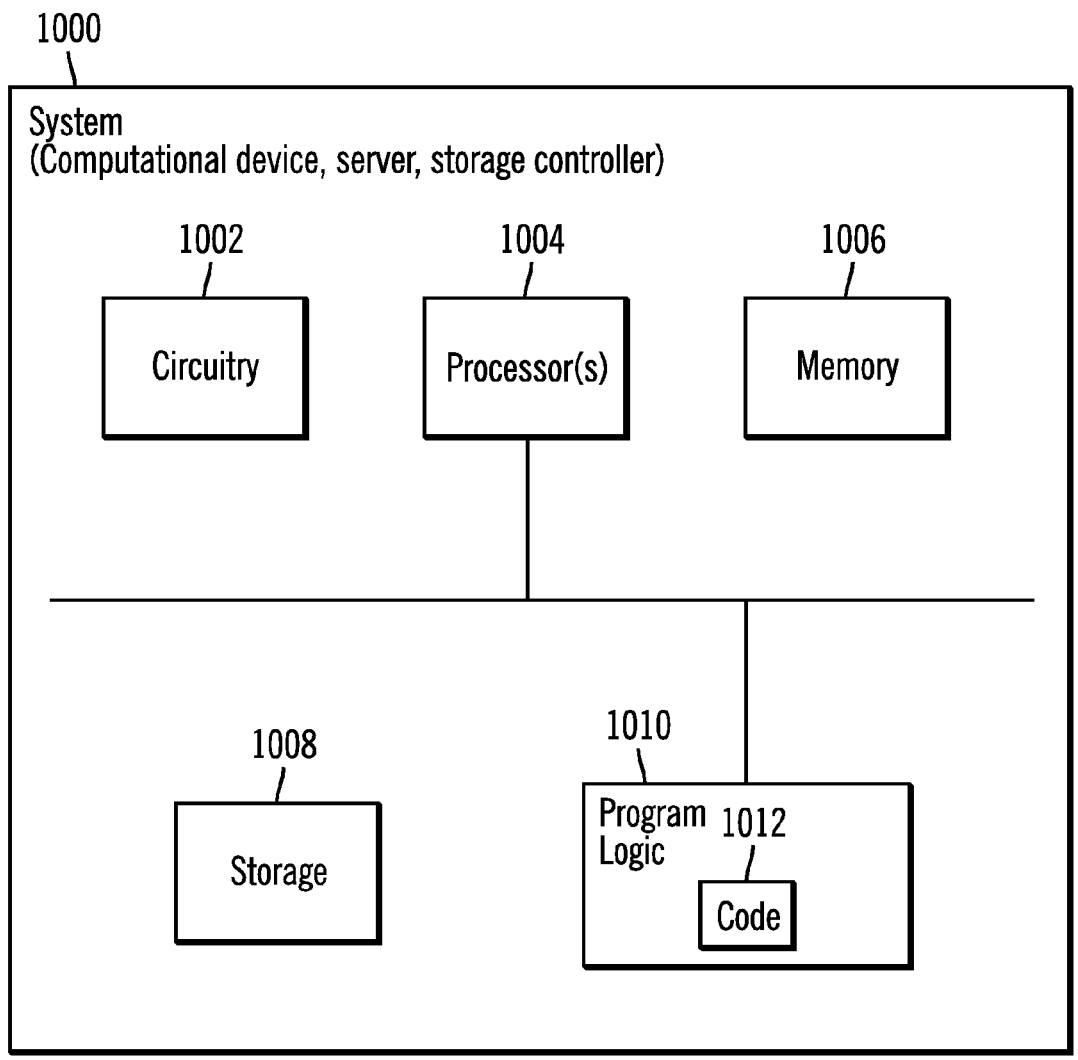
FIG. 10 illustrates a block diagram that shows how certain elements may be included in the client and server in the computing environment of FIG. 1, in accordance with certain embodiments.

FIG. 10 illustrates a block diagram that shows certain elements that may be included in the client 100 and the server 102 in accordance with certain embodiments. One or more of the client 100 and the server 102 may either individually or collectively be referred to as a system 1000, and may include a circuitry 1002 that may in certain embodiments include a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-10 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-10 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A computer readable storage medium, wherein code stored in the computer readable storage medium when executed by a processor causes operations, the operations comprising:
   maintaining a first data model in which a large dataset is stored, wherein a first set of operations is allowed to be performed on the first data model;
   reducing the first data model to a second data model that is of a smaller size than the first data model;
   restricting selected operations of the first set of operations from being performed on the second data model; and
   performing a second set of operations on the second data model, wherein the second set of operations is a subset of the first set of operations, and wherein the second set of operations does not include the selected operations that have been restricted from being performed on the second data model.

2. The computer readable storage medium of claim 1, wherein:
   (a) the first data model is a server data model that is stored in a server; and
   (b) the second data model is a table data model that is stored in a client, wherein a user interface corresponding to the table data model that is stored in the client is a hybrid table, wherein the reducing of the first data model in which the large dataset is stored to the second data model that is the table data model is performed by table filtering.

3. The computer readable storage medium of claim 2, wherein the selected operations that are restricted from being performed in the table data model that is stored in the client include sorting operations.

4. The computer readable storage medium of claim 2, the operations further comprising:
   changing the server data model that is stored in the server; and
   updating the table data model stored in the client, in response to changing the server data model stored in the server.

5. The computer readable storage medium of claim 1, wherein:
   the first data model is a server data model that is stored in a server; and
   the second data model is a table data model that is stored in a client.

6. A system, comprising:
   a memory; and
   a processor coupled to the memory, wherein the processor performs operations, the operations comprising:
   (i) maintaining a first data model in which a large dataset is stored, wherein a first set of operations is allowed to be performed on the first data model;
   (ii) reducing the first data model to a second data model that is of a smaller size than the first data model;
   (iii) restricting selected operations of the first set of operations from being performed on the second data model; and
   (iv) performing a second set of operations on the second data model, wherein the second set of operations is a subset of the first set of operations, and wherein the second set of operations does not include the selected operations that have been restricted from being performed on the second data model.

7. The system of claim 6, wherein:
   (a) the first data model is a server data model that is stored in a server; and
   (b) the second data model is a table data model that is stored in a client, wherein a user interface corresponding to the table data model that is stored in the client is a hybrid table, wherein the reducing of the first data model in which the large dataset is stored to the second data model that is the table data model is performed by table filtering.

8. The system of claim 7, wherein the selected operations that are restricted from being performed in the table data model that is stored in the client include sorting operations.

9. The system of claim 7, the operations further comprising:
   changing the server data model that is stored in the server; and
   updating the table data model stored in the client, in response to changing the server data model stored in the server.

10. The system of claim 6, wherein:
    the first data model is a server data model that is stored in a server; and
    the second data model is a table data model that is stored in a client.

11. A method, comprising:
    maintaining, via a processor, a first data model in which a large dataset is stored, wherein a first set of operations is allowed to be performed on the first data model;
    reducing, via the processor, the first data model to a second data model that is of a smaller size than the first data model;
    restricting selected operations of the first set of operations from being performed on the second data model; and
    performing a second set of operations on the second data model, wherein the second set of operations is a subset of the first set of operations, and wherein the second set of operations does not include the selected operations that have been restricted from being performed on the second data model.

12. The method of claim 11, wherein:
    (a) the first data model is a server data model that is stored in a server; and
    (b) the second data model is a table data model that is stored in a client, wherein a user interface corresponding to the table data model that is stored in the client is a hybrid table, wherein the reducing of the first data model in which the large dataset is stored to the second data model that is the table data model is performed by table filtering.

13. The method of claim 12, wherein the selected operations that are restricted from being performed in the table data model that is stored in the client include sorting operations.

14. The method of claim 12, the method further comprising:
changing the server data model that is stored in the server; and
updating the table data model stored in the client, in response to changing the server data model stored in the server.

15. The method of claim 11, wherein:
the first data model is a server data model that is stored in a server; and
the second data model is a table data model that is stored in a client.

16. A method for deploying computing infrastructure, comprising integrating computer-readable code into a computing system, wherein the code in combination with the computing system is capable of performing operations, the operations comprising:
maintaining, via a processor, a first data model in which a large dataset is stored, wherein a first set of operations is allowed to be performed on the first data model;
reducing, via the processor, the first data model to a second data model that is of a smaller size than the first data model;
restricting selected operations of the first set of operations from being performed on the second data model; and
performing a second set of operations on the second data model, wherein the second set of operations is a subset of the first set of operations, and wherein the second set of operations does not include the selected operations that have been restricted from being performed on the second data model.

17. The method for deploying computing infrastructure of claim 16, wherein:
(a) the first data model is a server data model that is stored in a server; and
(b) the second data model is a table data model that is stored in a client, wherein a user interface corresponding to the table data model that is stored in the client is a hybrid table, wherein the reducing of the first data model in which the large dataset is stored to the second data model that is the table data model is performed by table filtering.

18. The method for deploying computing infrastructure of claim 17, wherein the selected operations that are restricted from being performed in the table data model that is stored in the client include sorting operations.

19. The method for deploying computing infrastructure of claim 17, the operations further comprising:
changing the server data model that is stored in the server; and
updating the table data model stored in the client, in response to changing the server data model stored in the server.

20. The method for deploying computing infrastructure of claim 16, wherein:
the first data model is a server data model that is stored in a server; and
the second data model is a table data model that is stored in a client.

* * * * *